(12) United States Patent (10) Patent No.: US 9,405,755 B1
Bailey et al. (45) Date of Patent: Aug. 2, 2016

(54) APPARATUS AND METHOD FOR PROCESSING LOG FILE DATA

(71) Applicant: Initial State Technologies, Inc., Brentwood, TN (US)

(72) Inventors: James Ray Bailey, Brentwood, TN (US); David Leo Sulpy, Nashville, TN (US); Adam Matthew Reeves, Nashville, TN (US)

(73) Assignee: Initial State Technologies, Inc., Brentwood, TN (US)

( * ) Notice: Subject to any disclaimer, the term of this patent is extended or adjusted under 35 U.S.C. 154(b) by 123 days.

(21) Appl. No.: 14/340,011

(22) Filed: Jul. 24, 2014

Related U.S. Application Data

(63) Continuation-in-part of application No. 14/045,731, filed on Oct. 3, 2013.

(51) Int. Cl.
*G06F 11/32* (2006.01)
*G06F 17/30* (2006.01)

(52) U.S. Cl.
CPC .............................. *G06F 17/30076* (2013.01)

(58) Field of Classification Search
CPC ................................................. G06F 11/0769
USPC ............................................................ 714/57
See application file for complete search history.

(56) References Cited

U.S. PATENT DOCUMENTS

| | | | |
|---|---|---|---|
| 7,480,071 B2 | 1/2009 | Bailey et al. | |
| 7,486,834 B2 | 2/2009 | Bailey et al. | |
| 7,551,323 B2 | 6/2009 | Bailey et al. | |
| 7,580,564 B2 | 8/2009 | Bailey et al. | |
| 7,602,531 B2 | 10/2009 | Bailey et al. | |
| 7,653,785 B2 | 1/2010 | Bailey et al. | |
| 7,821,687 B2 | 10/2010 | Bailey et al. | |
| 8,103,712 B2 | 1/2012 | Bailey et al. | |
| 8,210,631 B2 | 7/2012 | Bailey et al. | |
| 8,516,304 B2 | 8/2013 | Bailey et al. | |
| 2003/0174694 A1 | 9/2003 | Mitchell et al. | |
| 2003/0217345 A1 | 11/2003 | Rajsuman et al. | |
| 2004/0039692 A1 | 2/2004 | Shields et al. | |
| 2004/0127197 A1 | 7/2004 | Roskind | |
| 2005/0071812 A1* | 3/2005 | Ramkumar | G06F 11/3664 717/124 |
| 2005/0102564 A1* | 5/2005 | Oeda | G06F 11/3476 714/20 |
| 2006/0095853 A1 | 5/2006 | Amyot et al. | |
| 2006/0129484 A1 | 6/2006 | Hurwitz et al. | |
| 2006/0161879 A1 | 7/2006 | Lubrecht et al. | |
| 2006/0259274 A1* | 11/2006 | Greco | G06F 11/3409 702/182 |
| 2007/0139370 A1 | 6/2007 | Lu et al. | |
| 2007/0240217 A1 | 10/2007 | Tuvell et al. | |
| 2007/0283194 A1* | 12/2007 | Villella | G06F 11/3476 714/57 |
| 2008/0126538 A1 | 5/2008 | Uyama et al. | |
| 2009/0164439 A1 | 6/2009 | Nevins | |
| 2009/0248395 A1 | 10/2009 | Alewine et al. | |
| 2009/0276446 A1* | 11/2009 | Graf | G06F 17/30569 |
| 2009/0276675 A1* | 11/2009 | Ojala | H04L 1/1819 714/749 |
| 2010/0146510 A1 | 6/2010 | Teichmann et al. | |
| 2010/0161574 A1* | 6/2010 | Davidson | G06F 17/30572 707/705 |

(Continued)

*Primary Examiner* — Chae Ko
(74) *Attorney, Agent, or Firm* — Cooley LLP (57) ABSTRACT

A method implemented by a computer includes receiving a log file with log file data characterizing the operation of a system. A normalized format for the log file data is proposed. User input on the normalized format is solicited. The normalized format is set. The log file data is converted to the normalized format. A visualization application operative with the normalized format is selected. The visualization application supplies visualizations of the log file data.

7 Claims, 12 Drawing Sheets

(56) References Cited

U.S. PATENT DOCUMENTS

| | | |
|---|---|---|
| 2010/0214296 A1 | 8/2010 | Kawamura |
| 2010/0238983 A1 | 9/2010 | Banhegyesi |
| 2011/0047423 A1 | 2/2011 | Bailey |
| 2011/0047424 A1 | 2/2011 | Bailey et al. |
| 2011/0154117 A1 | 6/2011 | Danielson et al. |
| 2011/0167311 A1 | 7/2011 | Bailey et al. |
| 2011/0181419 A1 | 7/2011 | Mack et al. |
| 2012/0054675 A1* | 3/2012 | Rajamannar ........ G06F 11/0769 715/809 |
| 2012/0078667 A1 | 3/2012 | Denker et al. |
| 2012/0144256 A1 | 6/2012 | Bailey et al. |
| 2012/0259965 A1 | 10/2012 | Tsuzuki et al. |
| 2013/0332594 A1 | 12/2013 | Dvir et al. |
| 2014/0283083 A1* | 9/2014 | Gula ................... H04L 63/1433 726/25 |
| 2014/0358637 A1* | 12/2014 | Kahneman ......... G06Q 30/0203 705/7.32 |
| 2015/0178634 A1* | 6/2015 | Chen ...................... G06F 11/36 706/12 |

\* cited by examiner

APPARATUS AND METHOD FOR PROCESSING LOG FILE DATA

CROSS-REFERENCE TO RELATED APPLICATION

This application is a continuation-in-part of U.S. Ser. No. 14/045,731, filed Oct. 3, 2013.

FIELD OF INVENTION

This invention relates generally to system debugging. More particularly, this invention relates to techniques for system debugging by processing log file data.

BACKGROUND OF THE INVENTION

A log file is a file that records events that take place during the execution of a system. A log file represents an audit trail of events that can be used to understand the activity of a system and therefore be used to diagnose problems.

Unfortunately, log files are difficult to decipher. For example, a log file may have a cryptic format and may include an overwhelming number of events. Consequently, computer programs are typically written to interpret information in log files. Special expertise is required to prepare such computer programs. Another challenge is that different computer programs are required for different log file formats.

In view of the foregoing, it would be desirable to provide improved techniques for processing log file data.

SUMMARY OF THE INVENTION

A method implemented by a computer includes receiving a log file with log file data characterizing the operation of a system. A normalized format for the log file data is proposed. User input on the normalized format is solicited. The normalized format is set. The log file data is converted to the normalized format. A visualization application operative with the normalized format is selected. The visualization application supplies visualizations of the log file data.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
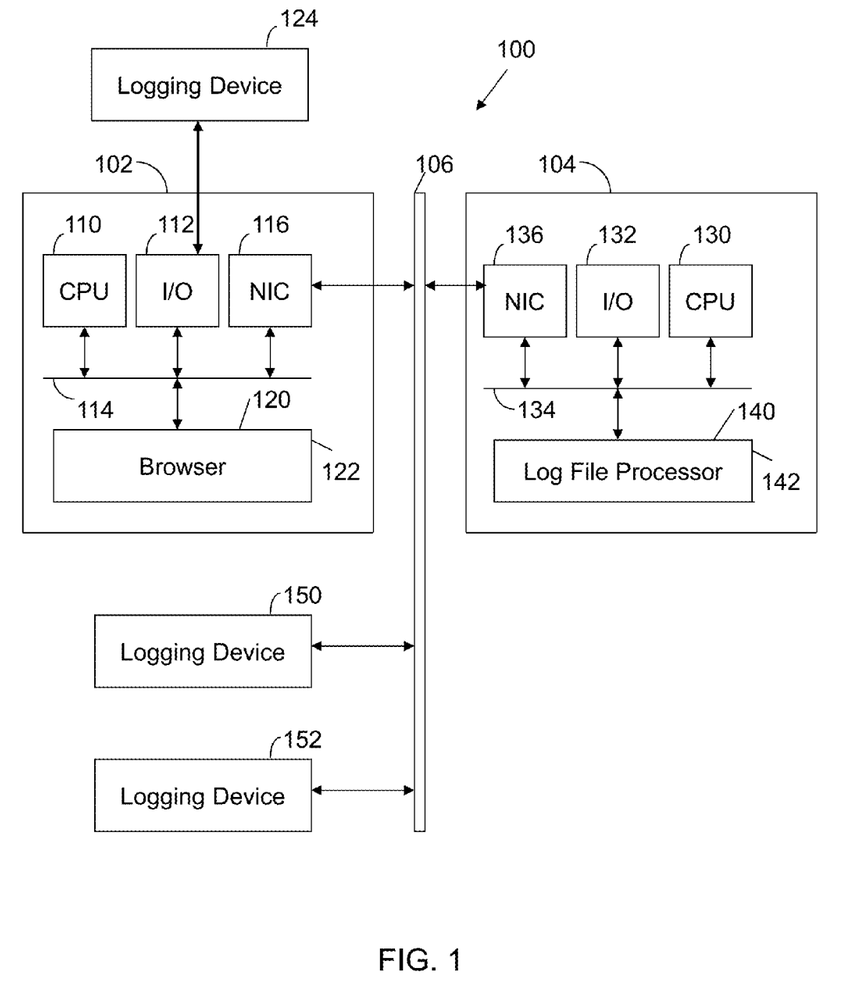
FIG. 1 illustrates a system configured in accordance with an embodiment of the invention.

FIG. 1 illustrates a system 100 configured in accordance with an embodiment of the invention. In this example, the system 100 includes a client computer 102 connected to a server computer 104 via a network 106. The network 106 may be any combination of wired and wireless networks.

Client computer 102 includes standard components, such as a central processing unit 110 and input/output devices 112 connected via a bus 114. The input/output devices 112 may include a keyboard, mouse, touch display and the like. The input/output devices 112 may also include ports for connection to an external device, such as a logging device 124. As used herein, a logging device 124 is any instrumentality that creates a textual description of the operation of a system. The instrumentality may be a hardware instrument (e.g., a printer) or a software instrument (e.g., a segment of code recording certain events).

A network interface circuit 116 is also connected to bus 114. The network interface circuit 116 provides connectivity to network 106. A memory 120 is also connected to the bus 114. The memory 120 may store a browser to provide an interface to server 104.

Server 104 also includes standard components, such as a central processing unit 130 and input/output devices 132 connected via bus 134. A network interface circuit 136 is also connected to bus 134. A memory 140 is also connected to bus 134. The memory 140 stores a log file processor 142, which includes executable instructions to implement operations of the invention. In particular, the log file processor 142 includes instructions to receive and process log file data, as discussed herein. The log file processor 142 may receive a log file via network 106. For example, the logging device 124 may supply a log file via client device 102. Alternately, logging devices 150 and 152 may be directly connected to network 106 to supply the log file processor 142 with log files.

The disclosed system 100 operates in accordance with a client-server paradigm. In this paradigm, the server 104 operates as a service available to many devices via network 106. Alternately, the system 100 may be implemented such that log file processor 142 is resident on a client device 102. In this configuration, the log file processor 142 directly processes a log file from an attached logging device 124 without utilization of network 106.

Figure 2:
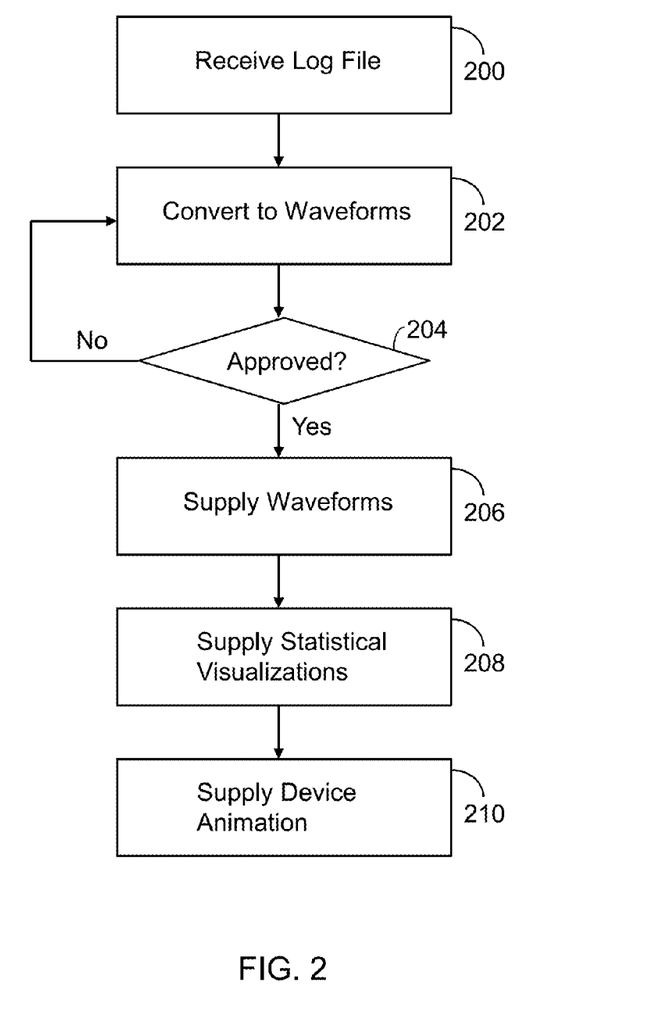
FIG. 2 illustrates processing operations associated with an embodiment of the invention.

FIG. 2 illustrates processing operations associated with an embodiment of the log file processor 142. Initially, a log file is received 200. As indicated above, the log file may be received from a device directly attached to the platform executing the log file processor 142 or the log file may be received over network 106 from a remote logging device (e.g., logging device 124, 150 or 152). Textual descriptions of system events are converted to waveforms 202. Optionally, the log file processor 142 may solicit feedback from a user regarding a proposed mapping of events to event waveforms 204. If the mapping is not approved (204—No), then another conversion transpires 202. If the mapping is approved (204—Yes), then waveforms are supplied 206, as discussed below. The log file processor 142 may optionally supply statistical visualizations 208, as demonstrated below. In addition, the log file processor 142 may optionally supply device animations 210, as discussed below.

A log file will typically have a format similar to the following:

Timestamp<delimiter>Event ID<delimiter>Event Value/Description<end log value>

There are three basic elements in a log file: Timestamp, Event ID, Event Value. These three elements may be combined to form a single data point in an event waveform. The event ID may be used to create a unique row in an event waveform. The timestamp may be used to specify the point on the x-axis when an event value changes for that event ID. The event value is displayed inside the row at the corresponding timestamp. The method for displaying the value can be as a binary bus, string, analog waveform, flag, or other event indicia. When either (a) a user uploads a file to the system or (b) the system pulls data from a product or (c) a product pushes data to the system, these three elements are transformed into event waveforms.

Consider the following log file:
02:34:47.248,695 ERROR_CHECK Found an error in module 5
02:34:47.248,748 INTERRUPT_SERVICE IRQ for motor controller begin service
02:34:47.248,758 MAINT_ID Clean sensor2 complete
02:34:47.309,792 INTERRUPT_SERVICE IRQ for motor controller end service
. . .

The log file processor 142 may take the first line of the file and ask the user to identify the timestamp. The user may highlight the complete timestamp and confirm. For the highlighted timestamp, the user may be asked to identify what each field of the timestamp represents (e.g., days, hours, minutes, seconds, milliseconds, microseconds, nanoseconds). The user may use a highlight to confirm each unit of time. The user may be asked to identify the event ID. The user may also be asked to identify the event value.

Once all identifications have been made, the log file processor 142 may auto-detect the delimiters (e.g., whitespace, tabs, semicolons, colons, commas, periods, newline characters) and attempt to parse the next line using the element order the user specified. The user may be asked to confirm that the system correctly identified each element in the next line (or all lines are highlighted with parsing/element information and the user can scan through them to verify correctness). The system may then parse the entire file and supply event waveforms. The file format may be preserved in a container file to be re-used the next time the user (or someone in the same organization) uploads a file of the same type.

Figure 3:
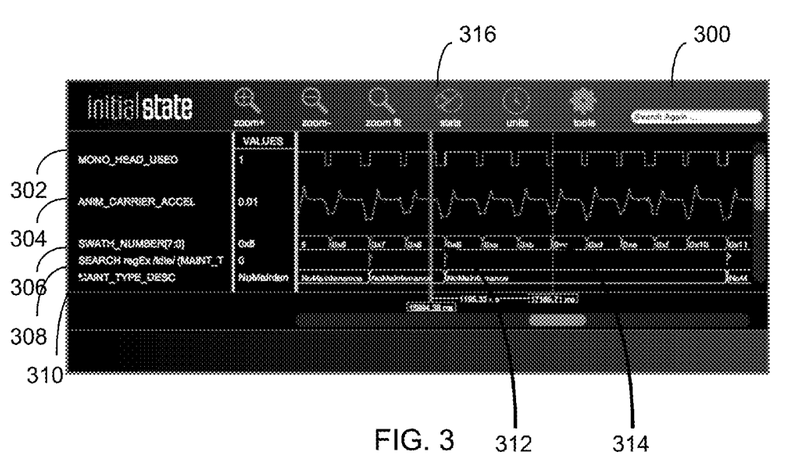
FIGS. 3-8 illustrate different user interfaces that may be used in accordance with embodiments of the invention.

Once a data log file has been broken down into a series of data points (e.g., where each data point includes a timestamp, an event ID, and event data), the data points can be transformed into event waveforms. FIG. 3 illustrates a user interface 300 displaying event waveforms. Each event waveform has a time axis and event indicia. Waveform 302 has an identified event ID of "MONO_HEAD_USED" and a corresponding binary waveform. In the transformation of data points to waveforms, a binary waveform may be drawn if either (a) the user specifies an event ID to be a binary waveform (e.g., user appends the name of the event ID with "(bit)") or if (b) all data values associated with that event ID are one of two values (1 or 0; true or false; active or inactive; on or off). Thus, an evaluation of the textual description in the log file may result in the automatic selection a waveform type and/or of event indicia.

Waveform 304 has an identified ID of "ANIM_CARRIER_ACCEL" and a corresponding analog waveform. The analog waveform has a magnitude where the height of the line drawn corresponds to the magnitude of the value for that event ID at that particular time. In the transformation of data points to waveforms, an analog waveform may be drawn if either (a) the user specifies an event ID to be an analog waveform (e.g., user appends the name of the event ID with "(analog)") or if (b) all data values associated with that event ID are a number in the format of base10 or base16 (e.g., "5443", "0x1234").

Waveform 306 has an identified ID of "SWATH_NUMBER[7:0]" and a corresponding digital bus waveform. A digital bus waveform is similar to an analog waveform in that the value of each data point is always a number. However, instead of a line with magnitude, the waveform is simply written as a numerical value surrounded by the lines (e.g., 0x7). One may switch between an analog view of an event ID with values of magnitude and a digital bus view (e.g., waveform(s) may toggle between analog and digital bus view via a menu option or a key stroke). In the transformation of data points to waveforms, a digital bus waveform may be drawn if either (a) the user specifies an event ID to be a digital bus waveform (e.g., user appends the name of the event ID with "(bus)") or if (b) all data values associated with that event ID are a number in the format of base 10 or base 16 (and the user defaults such a signal (event ID) to be drawn as digital waveform and not analog).

Waveform 308 has an identified ID of "searchREGeX/IDLE/(maint_T" and a corresponding flag waveform. A flag represents the presence of a value for that event ID at the corresponding instance of time. A flag could be used to indicate a search result, or a "hit". A flag could also be used to indicate an inserted comment from the user. The unique aspect of a flag is that it does not have a graphic drawn between values (not a continuous line like the other types of waveforms). A flag can be drawn as anything in that instance (not just a graphic of a flag, but rather an icon, mark, shape, etc). In the transformation of data points to waveforms, a flag may be drawn if either (a) the user specifies an event ID to be a flag (for example, appends the name of the event ID with "(flag)") or if (b) the user inserts data via a search or inserts comments and the data is saved in a format that indicates the event ID is a "flag".

Waveform 310 has an identified ID of "MAINT-TYPE-DESC" and a corresponding waveform with a string view. A signal that contains non-numerical values (e.g., "error detected") may be drawn as a string view waveform. This is drawn similarly to a digital bus view in that each time it changes, the waveform closes. However, it cannot be switched to an analog view. String view waveforms permit special formatting for key words such as color highlighting. In the transformation of data points to waveforms, a string view may be drawn if either (a) the user specifies an event ID to be a string view (e.g., user appends the name of the event ID with "(string)") or if (b) any data value associated with that event ID is detected to be non-numerical and non-binary in nature.

Other waveform types may be used in accordance with various embodiments of the invention. Other waveform types may be selected from animated elements (similar to flags but move in some way to visually indicate something like a gear spinning or a door opening), bars (the analog waveform is like a line graph and can be switched to something like a bar chart), heat data (a color-coded value to indicate magnitude), and others.

When dealing with huge data log files, there is often a lot of "junk" in the file that a user does not care about or certain sections that are more important than others (e.g., the first 40 seconds and the last 20 seconds might be irrelevant to a user's analysis while the middle 60 seconds is relevant). Zooming in and out of data and scrolling allows a user to focus on relevant sections while removing the "junk" sections from view. This is one of the features of a digital waveform viewer that makes it appealing as an interactive data visualization tool. When doing data analysis, these same issues apply. A user wants to generate statistics from the data set, but only on certain sections of that data set. Another problem with statistics is that the type of statistical view a user wants to use depends on the dataset itself.

Figure 4:
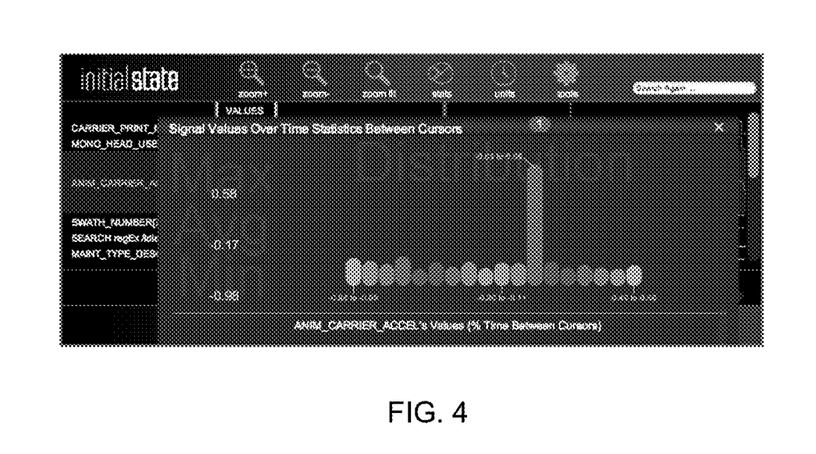

An embodiment of the invention allows a user to move time cursors to any position along event waveforms and then view statistics on selected event IDs (signals) for data that resides between time cursors. Vertical lines 312 and 314 of FIG. 3 provide an example of set cursors. Once the cursors are set, the "Stats" drop down menu 316 may be selected. A menu item may be "Signal Data Stats", selection of which provides data statistics for a specified signal in the specified time range. For example, if the "ANIM_CARRIER_ACCEL" signal 304 is specified, the log file processor 142 may determine that this signal is an analog signal and may count how many data points are in the range. Based on this information, the log file processor 142 may select the appropriate statistical visualization to present to the user. In this case, a Minimum/Maximum/Average statistic along with a histogram (distribution) chart is supplied, as shown in FIG. 4.

Figure 5:
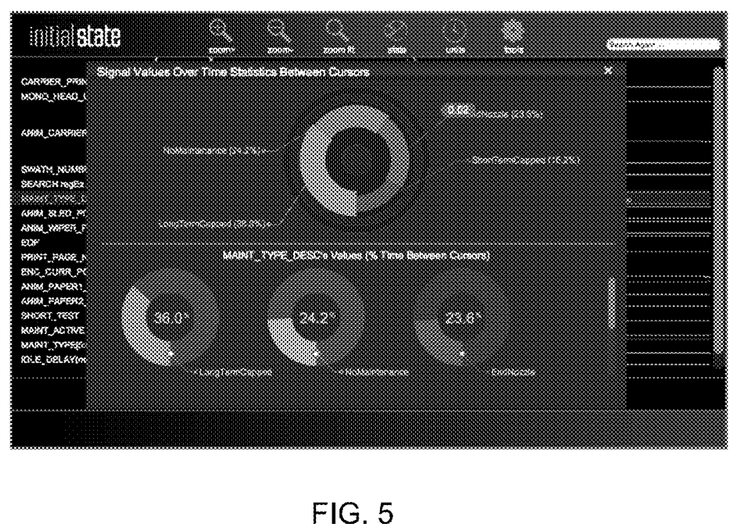

Suppose that the user then decides to look at statistics on MAINT_TYPE_DESC signal 310 for a specified time range. Using the same process, a pie chart may be shown along with several individual circle charts, as shown in FIG. 5. A different statistical visualization was selected because MAINT_TYPE_DESC is a string view waveform with a small number of unique data points. A pie chart is a more suitable visualization for this dataset and is chosen automatically by log file processor 142.

Figure 6:
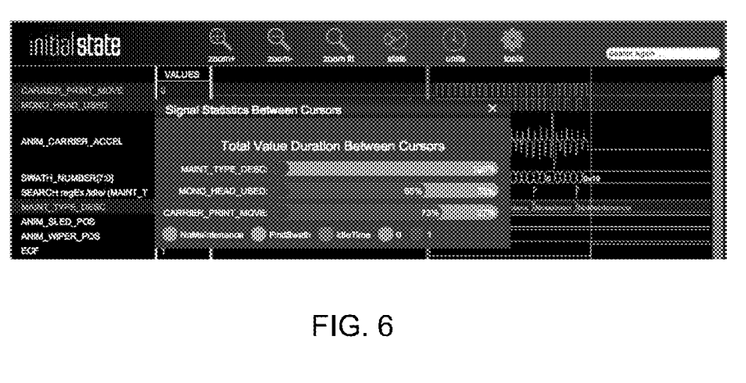

Suppose now that the user wants to see statistics on a group of signals, not just a single signal. The user may select three signals, CARRIER_PRINT_MOVE, MONO_HEAD, and MAINT_TYPE_DESC for a specified time range. The user makes the same menu selection steps as outlined above to generate signal data statistics. A different statistical visualization is shown because multiple signals have been selected. Since there are a low number of unique data points, a stacked bar chart is generated, as shown in FIG. 6.

Figure 7:
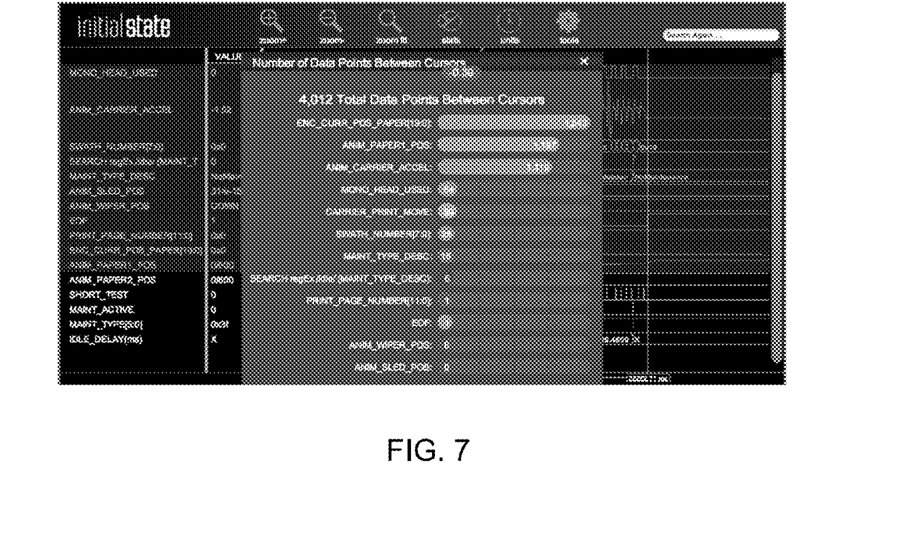

Another statistical data visualization available is the calculation of the number of data points between cursors. This may be made available with a "Signal Data Points" option in the "Stats" menu. FIG. 7 shows the resulting visualization in which a bar chart is used to show the number of data points for each selected signal between cursors.

Figure 8:
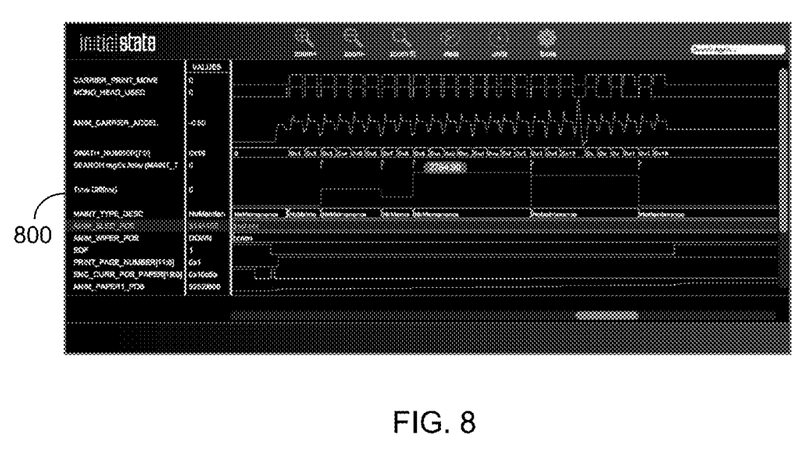

Continuing with this example, the user now wants to know the time between data values for the signal, SEARCH regEx /idle/ (MAINT_T 308. The user selects a Time Between Values option from the Stats menu, which generates a new signal on the waveform called Time Diff(ms). This new signal appears as a new row—a new waveform 800 in FIG. 8. This signal is a useful statistic that is viewed adjacent to other signals. This new waveform has the measured time between values of SEARCH regEx /idle/ (MAINT_T. The value of the waveform is in the unit, milliseconds, because the user currently selected the time unit to be displayed as milliseconds for the entire waveform. Since this generated statistic is a "signal" like the other signals, the user can pull statistics on this new signal just like the other ones in view using the same menu selections as before. Notice that the new signal is comprised of numerical values. It is automatically drawn as an analog signal.

Instead of collecting statistics between cursors, one could chose to collect statistics for data shown at a current zoom level (what is on the screen). A search facility associated with the log file processor 142 may also generate a new signal in the waveform when a user searches for specific values or ranges or uses regular expressions on strings. The search results may be presented as "flags" and can subsequently be analyzed by the built-in statistical operations described above. Dataset search is a critical feature for problem discovery. Generating signals for search results is extremely useful, as it allows one to drill down into huge datasets. A user will understand what portions of a dataset are necessary to drill down into. An embodiment of the invention allows one to drill down fast with targeted statistics. The log file processor 142 intelligently chooses statistical visualizations based on the dataset that a user is viewing (e.g., based upon dataset volume). This allows a user to mine through a huge file quickly. Thus, targeted statistics, search and zoom facilitate fast data mining.

The disclosed event waveforms may be used to facilitate the generation of animations of the operation of a system. In particular, the log file processor 142 may be configured to provide a data-driven animation tool tailored for users who want to quickly and easily create their own animated visuals without assistance from customer support. These animated visuals can be easily shared within an organization and used repeatedly on different datasets by different users Animations provide a powerful way for users to "see" millions of data points as they tell the story of what is happening through a representation of component movements.

In one embodiment, an animation contains a set of image layers, ordered from bottom to top. The log file processor 142 specifies which image layer is "moving" and which is static. The log file processor 142 maps moving image layers to specific Event IDs (signals). The value of the specified Event ID drives the position of the image layer. There is a defined set of movements performed on the specified data ranges of the specified Event ID (e.g., up, down, left, right, rotational angle, appear, and disappear).

A user may specify a motion animation and reuse the same configuration many times with different data files. A user can share the specific motion animation configuration and other users can drive that animation with different data files. The motion player may be implemented with many platforms (e.g., HTML5, iOS®, Android®, etc.). The same motion configuration may be used for any player platform and any data file that contains the specified Event IDs.

Figure 9:
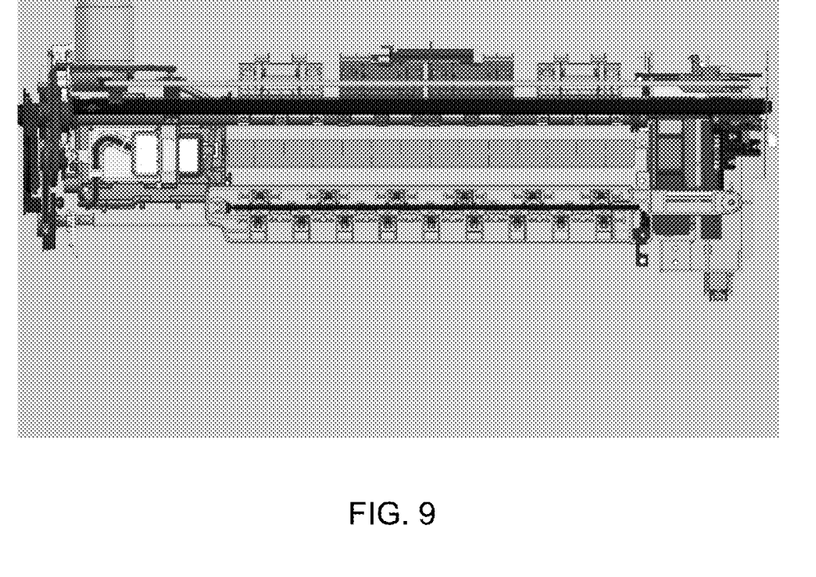
FIGS. 9-13 illustrate visual representations of a physical device that may be animated in response to event waveforms utilized in accordance with an embodiment of the invention.
Figure 10:
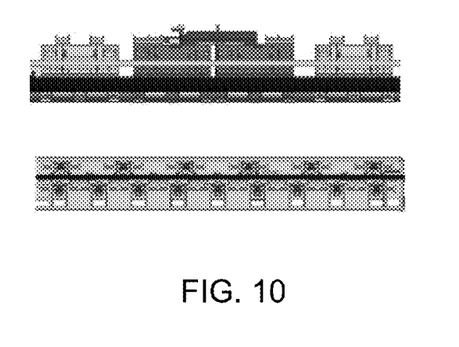
Figure 11:
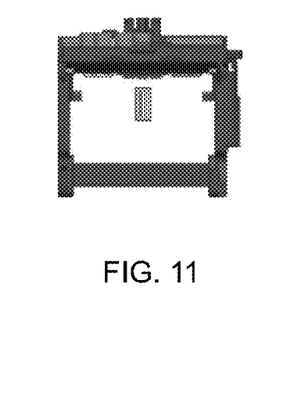

FIG. 9 illustrates an image of a bottom layer of a printer. A second layer (not shown) may be a piece of paper that moves above the bottom layer of the printer (i.e., FIG. 9). A third layer may be printer components that are above the paper, as shown in FIG. 10. A fourth layer may be an ink carriage that moves across layer three, as shown in FIG. 11.

The log file processor 142 allows a user to input (upload) each image layer that will be used for the animation and specify the order. The log file processor 142 prompts the user to define which image layers are moving and which are static. In this example, layers one and three are static while layers two and four are moving. The log file processor 142 prompts the user to specify which Event IDs (signals) drive the moving layers. In this example, the signal ANIM_CARRIER_POS drives layer four and ANIM_PAPER1_POS drives layer two.

Figure 12:
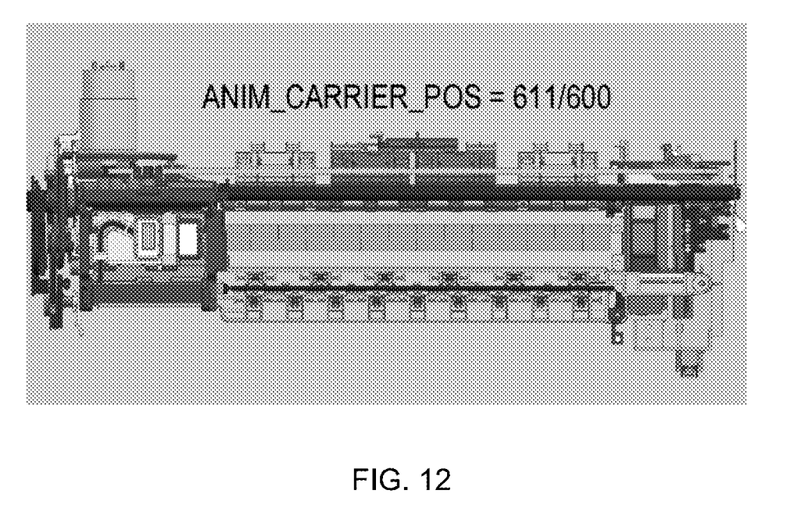
Figure 13:
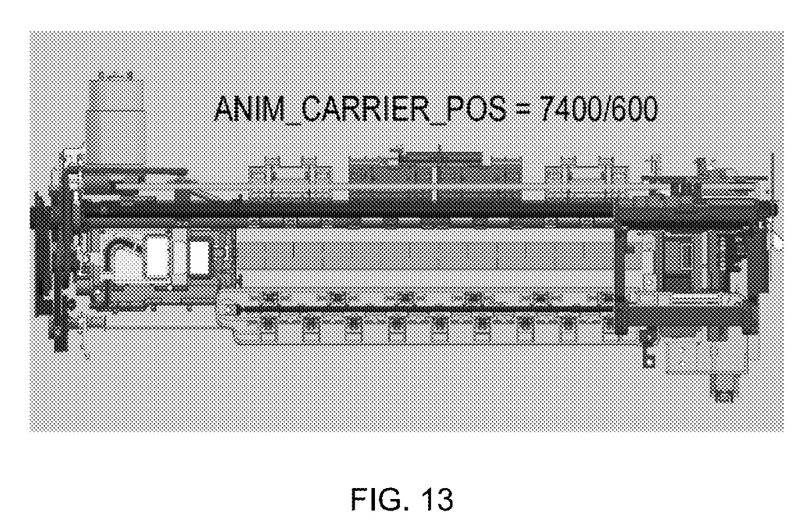

The log file processor 142 prompts the user to specify the positions of each static layer and the position of each moving layer for corresponding Event ID values (position/value pairs). For basic movements like "left-to-right", the user specifies the position of a layer and the corresponding Event ID value. The user then specifies the next position/Event ID value pair, and the process is repeated. The log file processor 142 calculates a linear response between position/value pairs to determine the position/values in between specified pairs. In this example, layer four is placed at the position shown in FIG. 12, which is the far left position of this layer in the animation. The user specifies that when ANIM_CARRIER_POS=611/600, this layer should be at this position. The user then specifies a second position/value pair as shown in FIG. 13.

Based on these two data points, the position/data pairs in between the two specified data points can be easily calculated. In this example, the y-position remains unchanged at pixel 176. The x-position moves from pixel 67 to pixel 679. The two position/data pairs are (X,Y),Value=(67,176),611/600 and (679,176),7400/600.

Event waveforms contain value/time pairs. The log file processor 142 reads in the value/time pairs for the ANIM_CARRIER_POS signal and places layer four at the corresponding position specified by the position/data pairs defined by the user. The log file processor 142 plays each frame of the animation at a user-defined speed. The user may want to play the animation at the exact speed defined by the data log file. The user may want to play the animation faster or slower.

The result of this system is a data-driven animation that can be reused on different data sets, shared with different users, and played on different platforms. The resultant data-driven animation provides a data visualization that allows a user to ingest millions of data points visually.

The log file processor 142 may also be configured to process meta information. The meta information may include the following:

- Comments from users (e.g., annotations about something the user noticed, past repair information, warranty notes) that pop up at user specified times. Comments may appear as text, audio, or video annotations.
- Markers/flags from users to identify specific moments and areas within a product that merit attention. Markers/flags may be created manually or by the user entering search values to automatically find relevant data.
- Ghosted image of a product's "ideal" motion view placed on top of the product's actual performance to make it easy for a user to compare the current view with design intent (i.e., semi-transparent overlay of the ideal animation above the current animation making it easy to see differences).
- Instructions pushed to users from a master source (e.g., a user is viewing a real-time motion animation of a belt spinning in their car and a manufacturer pushes instructions onto the screen to show to change the belt).

Thus, the invention transforms data that is difficult to understand into visualizations that facilitate rapid analysis (through the power and speed of sight). One can auto-detect certain datasets as they are read in order to identify the proper waveform to draw. Or, one can allow the user to specify what types of waveforms to draw. Or, one can learn from previous datasets that have been input what event ID names are being viewed as what type of waveform and apply that knowledge to the current view (e.g., a user always views a specific event ID as a digital bus waveform; the next time a dataset is opened with that event ID, a digital bus waveform is drawn instead of an analog waveform). It is powerful to draw 10,000,000 data points on a single screen—zoomed out—to see them all at once and visually identify anomalies. How they are drawn is critical: a digital waveform for a signal with 10,000,000 data points is awful when zoomed out, but an analog waveform may show a spike that indicates a problem. The log file processor 142 may automatically select a visualization based upon data volume.

The invention facilitates a no-touch web service where a user can upload a data log file in their proprietary format. Despite the proprietary format, the log file processor 142 generates event waveforms that automatically and quickly work in conjunction with data visualizations. The disclosed web-based hardware diagnostic services transform complex, big product data into interactive and actionable visualizations and analyses. The invention is operative in a connected world where billions of devices may be built and serviced at greater speed and efficiency. The invention supports a Diagnostics-as-a-Service (DaaS) model that delivers web-based interactive data visualizations and product analyses from any hardware product log file.

The disclosed data visualizations provide extraordinary value for users. That is, the disclosed data visualizations support problem discovery, data analysis, and information presentation. The disclosed interactive data visualization give users a better way to see product performance details and offer a superior alternative to traditional text editors that are commonly used to view product log data. Text-based product data is transformed into waveforms. Users can zoom in and out of data, measure time, perform advanced searches, amplify data, and view statistics on specified time windows. This simplifies the view for large, complex datasets commonly found in today's electrical and electromechanical products making problem discovery and analysis significantly faster than traditional techniques.

The invention also supports user-created animations. Users specify datasets that drive animated elements, upload images or use built-in images corresponding to those animated elements, and define the animation rules for each element (left/right, up/down, appear/disappear, rotational angle). The end result is a high-level visualization that can be utilized as a replay of mechanical motion, fluidic motion, component interaction, virtualized data flow, and the like.

Figure 14:
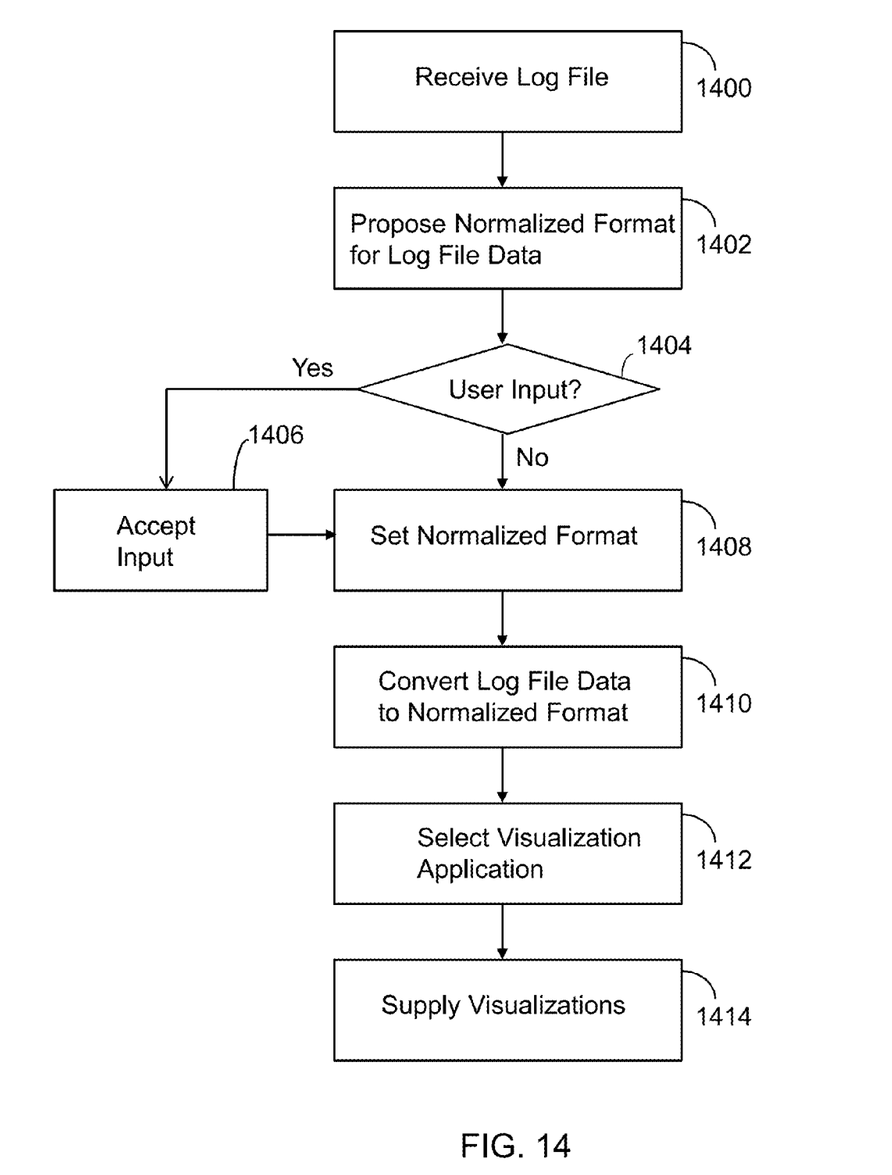
FIG. 14 illustrates processing operations associated with an alternate embodiment of the invention.

FIG. 14 illustrates processing operations associated with an alternate embodiment of the invention. Initially, a log file is received 1400. Consider the case of a file where each row of the file has a set of comma-separated values (CSV). Such files are referred to as CSV files. The following is an example of a CSV file that may be processed in accordance with an embodiment of the invention.

```
56:00.1, 0.998334166, 0, boot sequence initiated,
   65.4061548,, OFF, 6, Inactive,
56:04.1, 1.986693308,,, 123.361942,,,7,,
56:13.1, 2.955202067,,, 167.9039737,,, 8,,
56:15.1, 3.894183423,,, 195.7045973,,, 9,,
56:20.1, 4.794255386,,, 206.6247466,,, 10,,
56:25.1, 5.646424734,,, 203.5547758,,, 9,,
```

In this example, the comma-separated values are: "time, voltage, clock, message, Position, alarm, Switch, Power, Operation, Level". This schema may be passed as the first line of the file. Alternately, this schema may be discovered in accordance with an embodiment of the invention.

The next processing operation of FIG. 14 is to propose a normalized format for log file data (e.g., a normalized format for the comma-separated values). The normalized format has uniform parameters operative with a set of visualization applications, as discussed below. In one embodiment, the uniform parameters include a source name, a start time, a type, time offsets from the start time, and data values associated with the time offsets. The proposed normalized format may be presented to the user for user input 1404.

Figure 15:
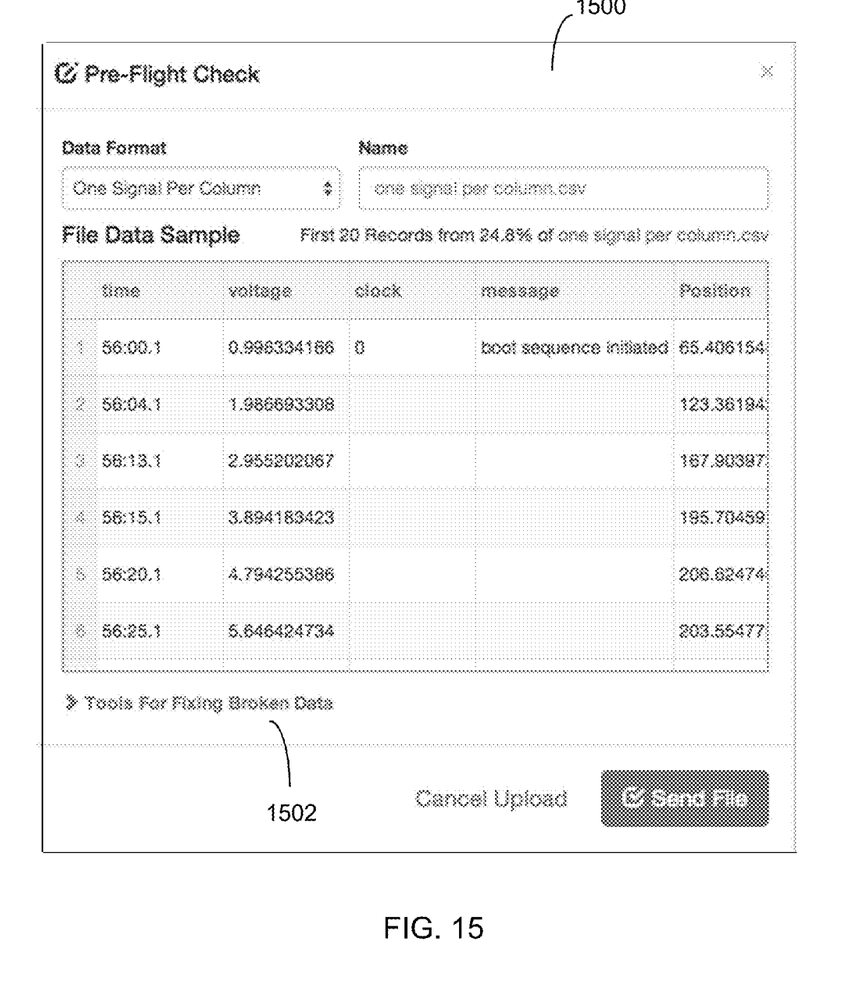
FIGS. 15-16 illustrate a graphical user interfaces that may be used in connection with the processing of FIG. 14.
Figure 16:
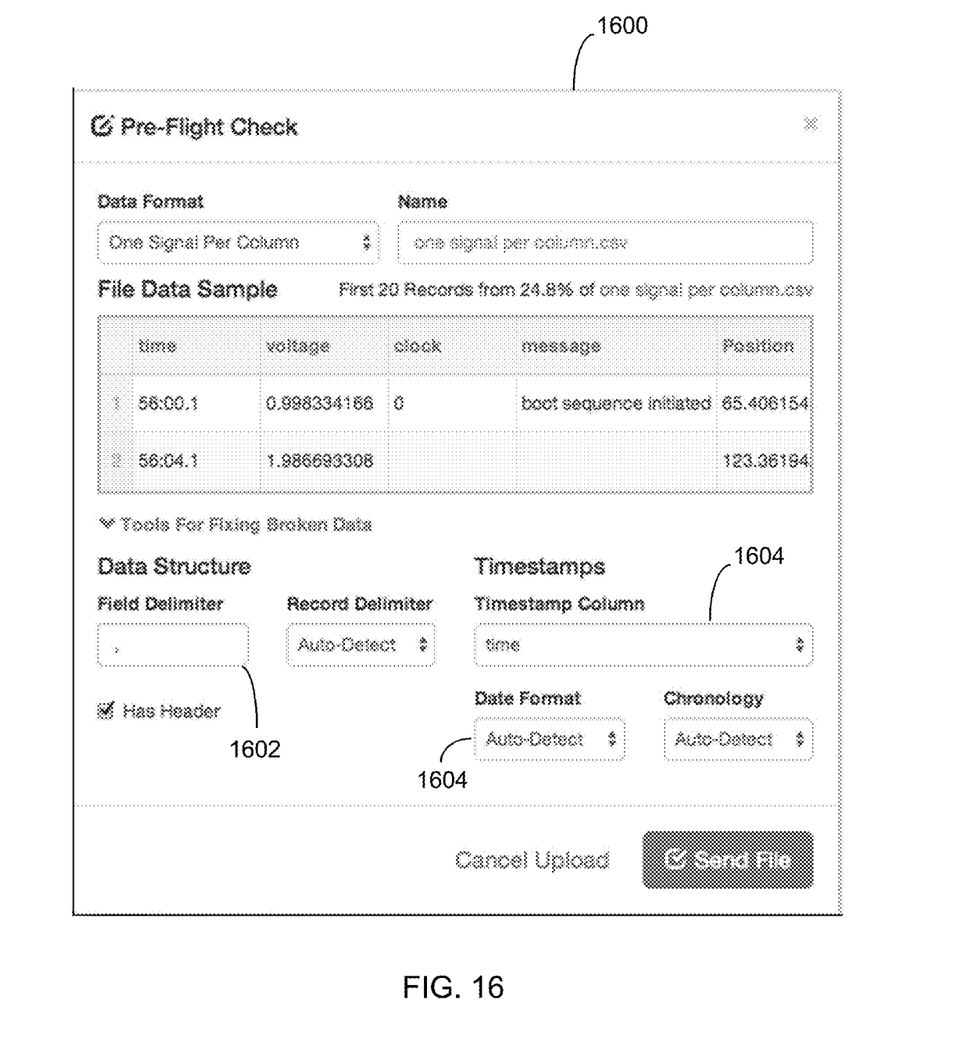

FIG. 15 is an example of a graphical user interface 1500 that may be used to propose a normalized format to a user. The graphical user interface 1500 has populated a table with values corresponding to the values in the example file listed above. The table has columns for time, voltage, clock, message and position. A prompt 1502 allows a user to specify an alternate schema. Activating the prompt 1502 indicates user input (1404—Yes; FIG. 14). Such activation may result in the graphical user interface 1600 of FIG. 16. In this example, a user may specify a field delimiter in block 1602, timestamp columns in block 1604 and a timestamp format in block 1604.

Returning to FIG. 14, any such input is accepted 1406. The normalized format is then set 1408. The format is set with or without user input (i.e., if there is no user input, then the proposed format is set as the normalized format).

The log file data is then converted to the normalized format 1410. This typically results in certain data fields being dropped. Still relying upon the foregoing example, the normalized format may be expressed as follows:

{
"Source": "Voltage"
"StartDateTime": "56:00.1",
"Type": "Number",
"Offsets": [0, 4.1, 13.1, 15.1, 20.1, 25.1, . . . ]
"Data": ["0.998334166", "1.986693308", "2.955202067", "3.894183423", . . . ]
}

The "StartDateTime" field is the first field in the first row of the example file above. The "Offsets" are the numeric time offsets from the "StartDateTime". The "Data" values are the voltage values, in this example, the second value of each row of the example file above.

Any number of data fields may be associated with normalized file formats of the invention. Below is an example of the same uniform parameters (i.e., "Source", "StartDateTime", "Type", "Offsets" and "Data"), but with a different set of data fields, in this case, "flag" types indicative of the presence or absence of a specified event:

{
"Source": "Clock",
"StartDateTime": "2014-07-01T12:00:00Z",
"Type": "Flag",
"Offsets": [0, 48.1, 1:32.1, 2:20.1, 3:11.1, . . . ],
"Data": ["true", "false", "true", "false", "true", . . . ]
}

The next operation of FIG. 14 is to select a visualization application 1412. A list of visualization applications may be supplied to a user. Each visualization application is operative with the normalized format. The visualization applications may be applications to produce waveforms, animations, charts, graphs, structured text, spark lines, digital bus values, flag values, string values, heat values and the like.

A visualization may be selected by the system automatically based upon properties of the normalized format. An automatically selected visualization may be confirmed by a user or may be selected by a user. If a user has specified rules for animations (such as the specification of an animation when certain signal names are present), a motion visualization application may be suggested. The motion visualization application is configured to present an animated visualization of the operation of the system. For example, the animated visualization may be pre-defined by the user for the signals in the log file, which drive the animated elements.

A log file with many number parameters may result in the selection of a charting visualization application configured to present the log file data in graphical form. The graphical forms may include line graphs, histograms, pie charts and the like.

A log file with a signal that has the same value repeated may result in the selection of a flag visualization application. The flag visualization application is configured to present a flag each time a specified event in the log file data occurs.

A log file with a signal that has only two values (e.g., on/off, up/down, enter/leave, enable/disable) may result in the selection of a visualization application with a bit signal configured to present one of two states in the log file data.

A log file containing a known or user-defined protocol or rule set may result in the selection of a decoded visualization application configured to present a decoded visualization of the operation of the system. For example, an Inter-Integrated circuit (i2c) bus has a serial data stream that can be de-serialized in the visualization to show n-bit address values and m-bit data values, instead of simply showing 1-bit data streams. Alternately, a quad-encoder signal can be visualized as a velocity/acceleration/position signal if the resolution of the encoder is specified. Alternately, a 3-axis accelerometer data set can be drawn in 3-D space.

Some log files, such as web server logs, contain many key/value pairs, attributes and a voluminous text. Such files are generally not conducive to visualizations. A separate filter may be used to identify and present specified values within such files.

The final processing operation of FIG. 14 is to supply visualizations 1414. The visualizations may be of the type discussed above and/or the type shown in FIGS. 3-13.

Figure 17:
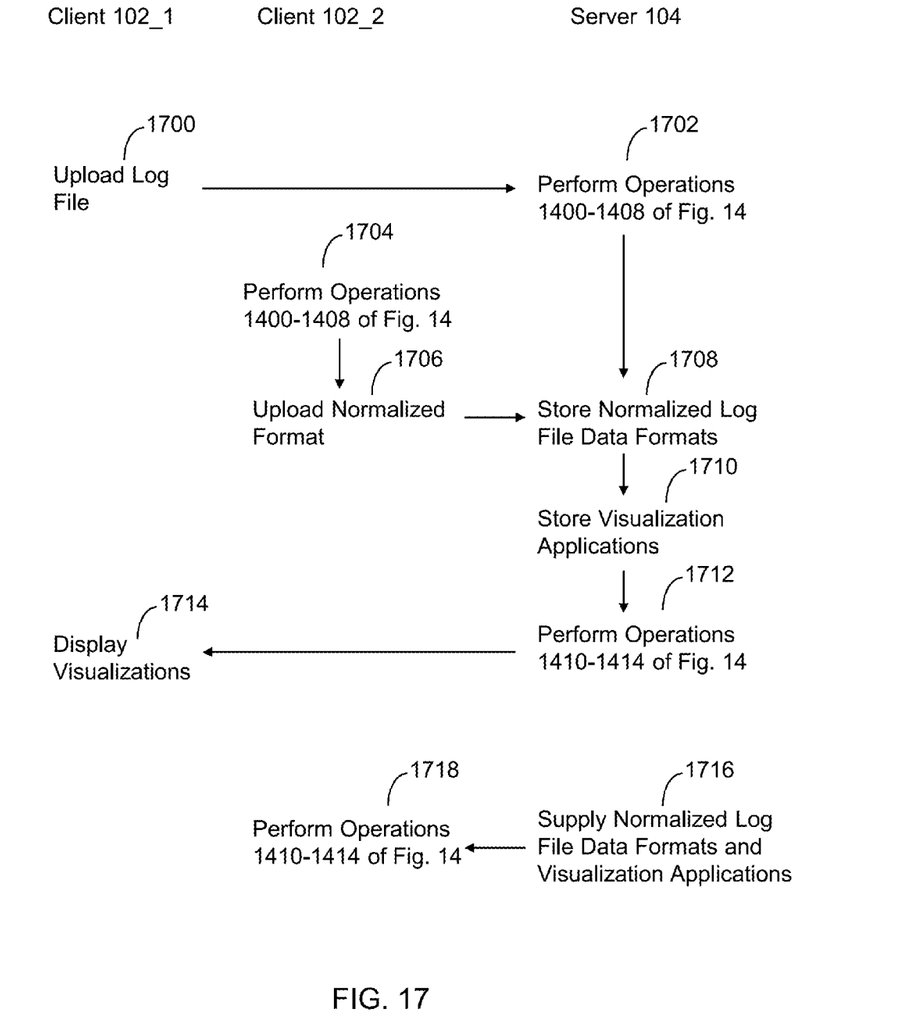
FIG. 17 illustrates processing operations performed by different devices in accordance with embodiments of the alternate embodiment of the invention.

FIG. 17 demonstrates that the operations of the invention may be performed in a variety of distributed manners. In particular, the figure shows a first client machine 102_1, a second client machine 102_2 and server 104. In one embodiment, the first client machine 102_1 uploads a log file 1700 to server 104. Server 104 then performs operations 1400 through 1408 of FIG. 14 1702. This results in a normalized log file data format that is stored 1708 on server 104 (the original uploaded log file may also be stored). Alternately or in addition, the second client device 102_2 may perform operations 1400 through 1408 of FIG. 14 1704. This results in a normalized format, which is uploaded 1706 to the server 104. Once again, the server 104 stores the normalized log file data format 1708. The server 104 also stores visualization applications 1710. Thus, an administrator of the server 104 may produce a variety of visualization application that are operative with the normalized formats.

The server may perform operations 1410 through 1414 of FIG. 1712 to produce visualizations, which are then displayed 1714 on the first client 102_1. Alternately or in addition, the normalized log file data formats and visualization applications may be supplied 1716 from the server 104 to the second client device 102_2. Thereafter, the second client device 102_2 may perform operations 1410 through 1414 of FIG. 14 1718. In this case, the second client device 102_2 receives what it needs to operate autonomously from the server 104. Alternately or in addition, the server 104 may supply the visualization applications alone, which are used in connection with locally stored log files. In this case, once again the second client device 102_2 operates autonomously from the server 104. This is advantageous in the event that the second client device 102_2 wants to utilize visualization applications without uploading data to a server (e.g., in the event that it is desirable to maintain log data behind a firewall).

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method implemented by a computer, comprising:
   receiving a log file with log file data characterizing the operation of a system;
   proposing a normalized format for the log file data;
   soliciting user input on the normalized format;
   setting the normalized format;
   converting the log file data to the normalized format;
   selecting a visualization application operative with the normalized format, wherein selecting includes selecting the visualization application from a plurality of visualization applications each operative with the normalized format and wherein selecting is based upon properties of the normalized format, wherein the plurality of visualization applications includes a bit signal application configured to present one of two states in the log file data; and
   supplying, by the visualization application, visualizations of the log file data.

2. The method of claim 1 wherein the normalized format has uniform parameters operative with a plurality of visualization applications.

3. The method of claim 1 wherein the uniform parameters include a source name, a start time, a type, time offsets from the start time, and data values associated with the time offsets.

4. The method of claim 1 wherein the plurality of visualization applications includes a motion visualization application configured to present an animated visualization of the operation of the system.

5. The method of claim 1 wherein the plurality of visualization applications includes a charting visualization application configured to present the log file data in graphical form.

6. The method of claim 1 wherein the plurality of visualization applications includes a flag visualization application configured to present a flag each time a specified event in the log file data occurs.

7. The method of claim 1 wherein the plurality of visualization applications includes a decoded visualization application configured to present a decoded visualization of the operation of the system.

* * * * *